April 15, 1952 E. A. ROCKWELL 2,593,192
ACCESSORY HYDRAULIC ADJUSTER
Filed Oct. 6, 1945 3 Sheets-Sheet 1
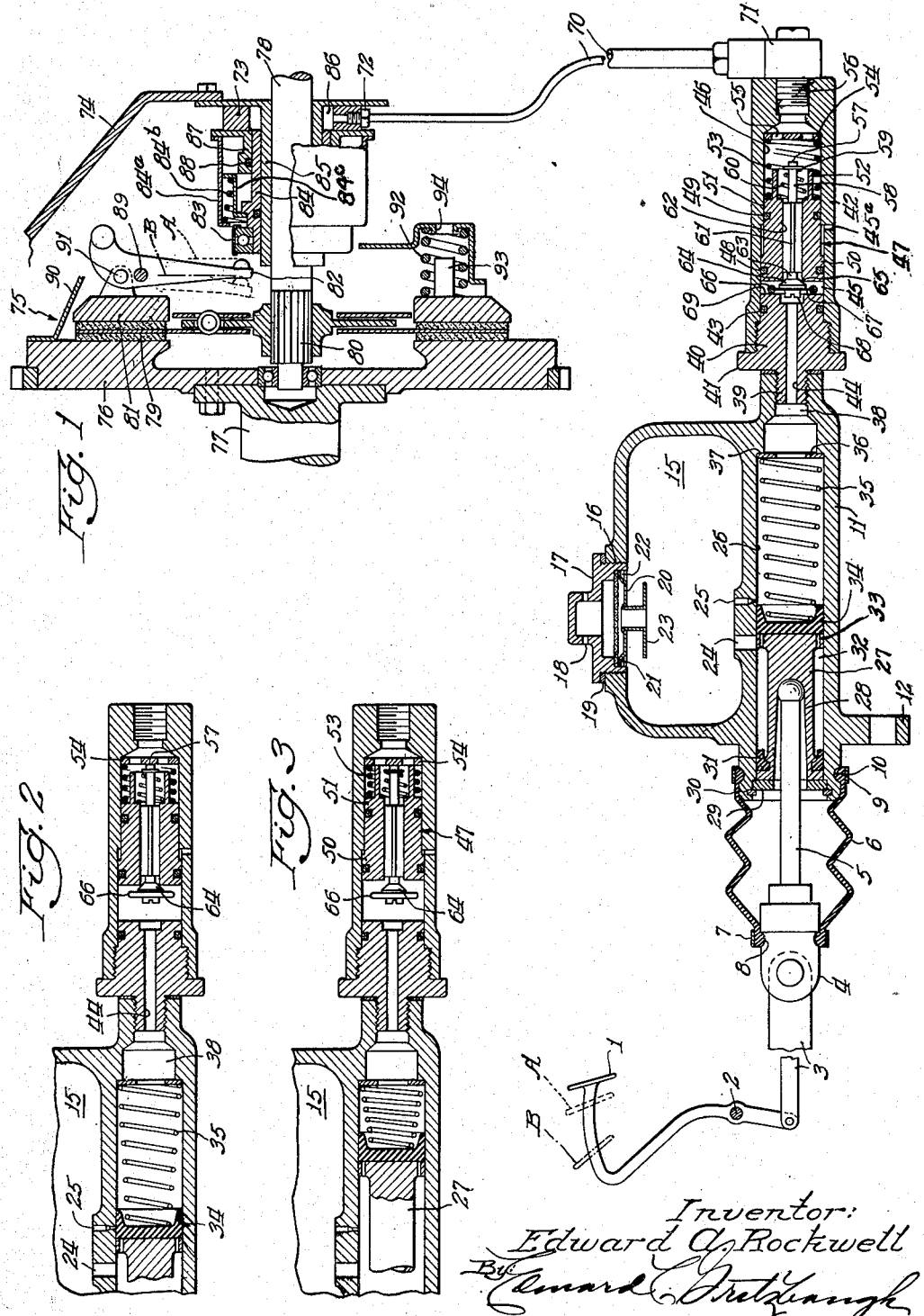
Inventor:
Edward A. Rockwell April 15, 1952    E. A. ROCKWELL    2,593,192
ACCESSORY HYDRAULIC ADJUSTER
Filed Oct. 6, 1945    3 Sheets-Sheet 2

Inventor:
Edward A. Rockwell

April 15, 1952  E. A. ROCKWELL  2,593,192
ACCESSORY HYDRAULIC ADJUSTER
Filed Oct. 6, 1945  3 Sheets-Sheet 3
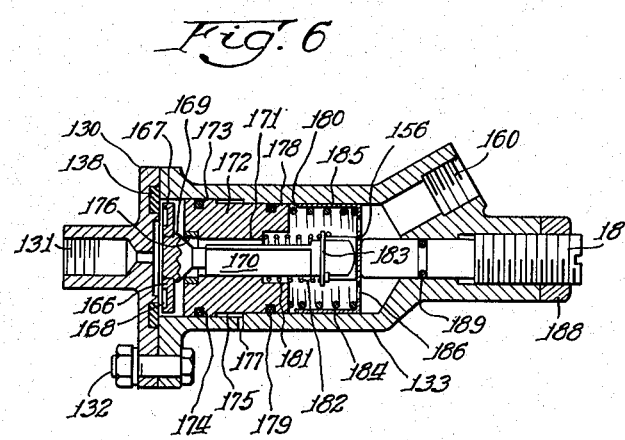
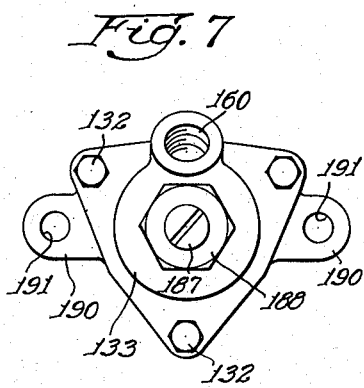
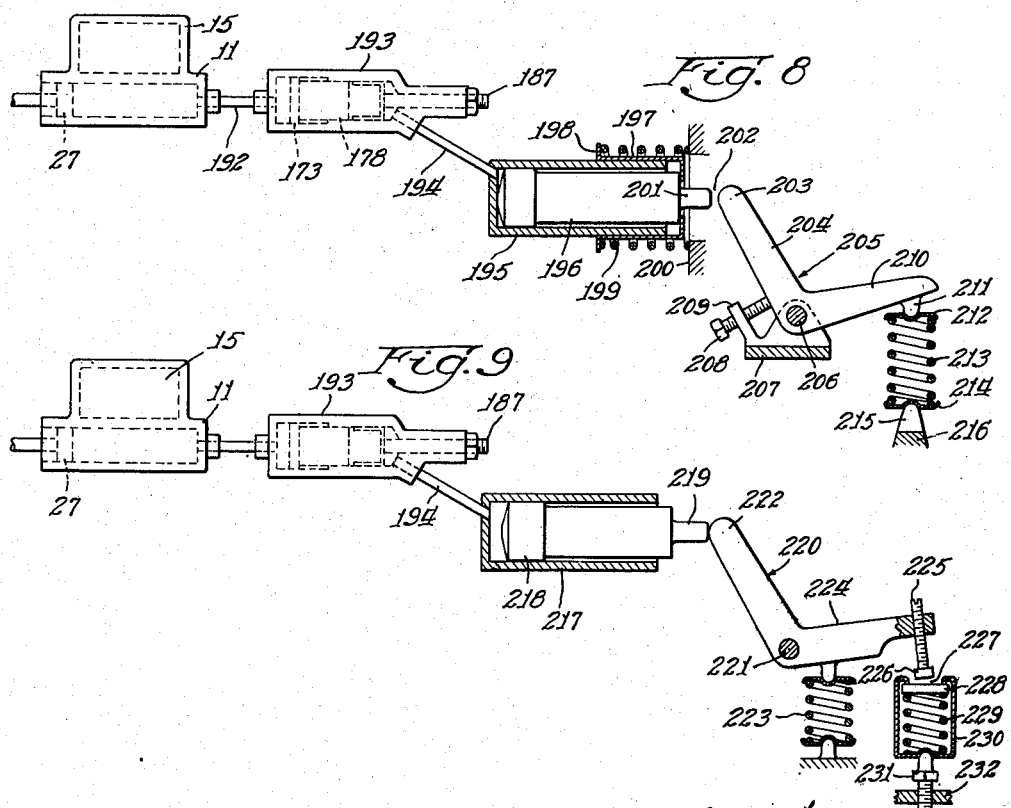

Patented Apr. 15, 1952

2,593,192

UNITED STATES PATENT OFFICE 2,593,192

ACCESSORY HYDRAULIC ADJUSTER

Edward A. Rockwell, Shaker Heights, Ohio, assignor, by mesne assignments, to Borg-Warner Corporation, Chicago, Ill., a corporation of Illinois Application October 6, 1945, Serial No. 620,753

16 Claims. (Cl. 60—54.5)

My invention relates particularly to a device for accurately and effectively controlling the clearance in pulsator devices and which is applicable to many different types of devices, but which has especial applicability, for example, in the control of clutches, brakes, or other accessories in automobiles, airplanes, etc.

The object of my invention is to provide a pulsator mechanism which will effectively control the clearance, etc., in apparatus of the above character. Another object is to provide a device of this kind which is readily applicable to variations in clearances of the devices to be controlled thereby. Another object is to provide a mechanism of this kind in which the clearance distance and clearance volume may be sharply and accurately measured. A further object is to provide such a mechanism, which is capable of adjustment to alter the clearance distance and volume thus measured. A further object is to provide a pulsator motor having a differential piston arranged to be operated by a low pressure to deliver a higher pressure followed by the unseating of a valve to deliver a lower pressure, thus rapidly taking up the clearance in the work-performing device, so as to determine sharply the take-up stage of the operation, inasmuch as the differential pressure will hold the piston advanced, without seating the valve, until the differential pressure has been overcome in the release of the pedal, thus accurately measuring off the clearance volume on the return stroke of the piston. This is accomplished by the differential piston pressure being exerted against a piston return spring. In this way, on the retraction of the piston the predetermined clearance distance and volume become accurately and sharply reconstituted. Thus, one of the important objects of my invention is to provide in the pulsator a differential piston arranged to deliver initially a higher pressure than the pressure received on the piston so as to intensify the sharpness of the point at which the change is made from one pressure to another in the delivery of the hydraulic fluid for operating the work-performing device, such, for instance, as a clutch or brake. Still another object is to provide a plunger with a cylinder for the same having a clearance volume which may be adjusted. Further objects of my invention will appear from the detailed description of the same hereinafter.

This arrangement overcomes the great disadvantages encountered in the prior devices intended as clearance or slack adjusters, as in the latter there was no accurate adjustment of the clearance volume of liquid supplied for taking up the clearance. This was due to the fact that, without the differential piston, for example, in the prior devices on the relaxation of any particular pedal braking pressure being applied the valve immediately seated at the variable pressure being applied thus producing a variable clearance volume, which, also, changed not only with the wear of the parts containing the clearance but with the changes of temperatures of the parts due to the heat producing expansion, as for instance in brake drums, on account of atmospheric temperatures, friction etc. In said prior devices, the increase of clearance volume of liquid transmitted thereto, due to the heating effects, etc., prevented the accurate return to the original clearance volume, and, in the case of brakes, upon cooling they would drag. My clearance adjuster adequately and accurately adjusts in either direction to the clearance volume desired and the clearance distance.

While my invention is capable of embodiment in many different forms, for the purpose of illustration I have shown only certain forms of the same in the accompanying drawings, in which:

Fig. 1 is a longitudinal vertical section of a clearance adjuster made in accordance with my invention, shown as attached to an automobile clutch for the operation of the same, the clutch being shown in its normally engaged position;

Fig. 2 is a similar vertical section of a portion of the same, showing the differential measuring piston at the point of zero clearance between the clutch fingers and the clutch throwout bearing with the clearance adjuster valve just beginning to open;

Fig. 3 is a similar view of the same showing the differential measuring piston at the end of its path of travel and with the clearance adjuster valve fully open;

Fig. 6 is a longitudinal section of a further modification of my invention;

Fig. 7 is an end elevation of the same;

Fig. 8 is a diagrammatic vertical section of a slack adjuster made in accordance with my invention, as applied to a normally closed clutch; and Fig. 9 is a diagrammatic vertical section of my invention as applied to a normally open clutch or a brake system.

Figure 4:
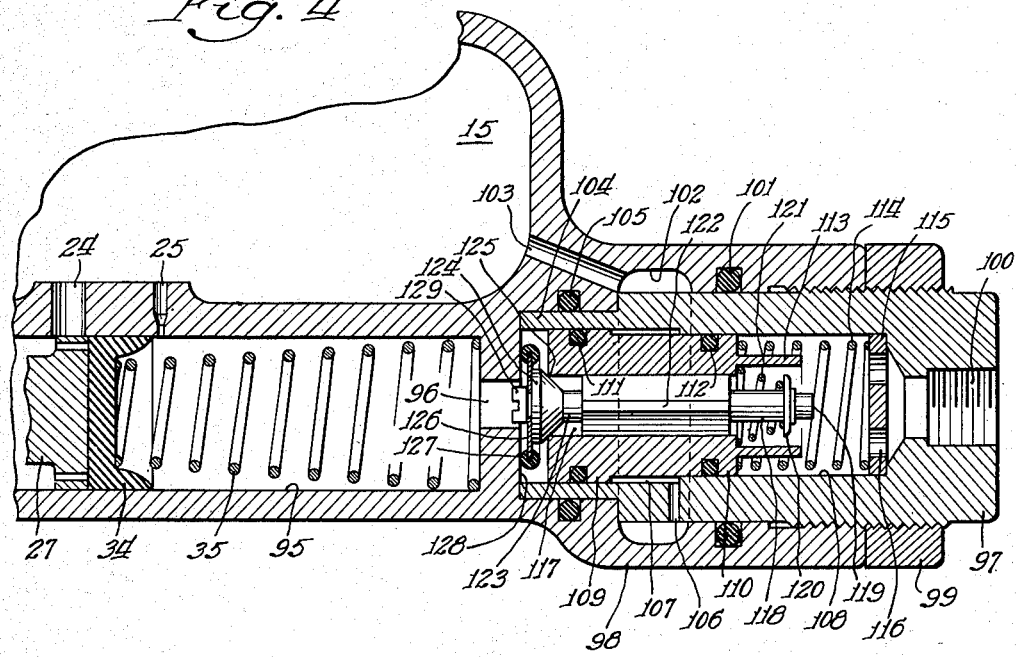
Fig. 4 is a vertical longitudinal section of a modified form of clearance adjuster showing the same as incorporated in the same casing with the master cylinder.

In the drawings, reference first to Figs. 1 to 3, I have shown a pedal 1 having a fixed pivot 2 carried on a chassis of an automobile (not shown). The lever 1 is connected by a link 3 to a yoke coupling 4 on a piston rod 5 having around the same a leather boot 6 fastened by a ring 7 in a groove 8 on the yoke coupling 4. The said boot 6 is fastened by another ring 9 in a groove 10 on a master cylinder casing 11. Said casing 11 has apertured ears 12, for attachment of the master cylinder to the automobile chassis. The said master cylinder, furthermore, has a liquid reservoir 15 provided with a filling opening 16 having a closed cap 17 and vent openings 18 as well as a sealing gasket 19. In the lower portion of the cap 17 there is a disc 20 having off-set ears 21 around the margin to provide apertures 22 in communication with the vent 18. The plate 20 supports an annular baffle 23.

The said reservoir 15, furthermore, has liquid compensation openings 24 and 25 communicating with a cylindrical chamber 26 in which there is arranged to reciprocate an impulser plunger or piston 27 provided with a recess 28 to receive the piston rod 5. At its forward end the cylinder 26 is provided with a ring 29, to limit the movement of the piston 27, which is held in place by a split ring 30. A sealing ring 31 seals the front end of the piston 27 and the latter is provided with an annular recess 32 communicating with longitudinal passageways 33 passing through the piston 27 so as to communicate with a flanged rubber ring 34 acting as a valve, secured to the rear face of the piston 27. A helical spring 35 resting against the rubber ring 34, is supported by a ring 36 from a shoulder 37 in the cylinder 26. Also, a discharge port 38 is located at the rear end of the cylinder 26, the same having screw-threaded therein a reduced portion 39 of a screw threaded adjustable casing head 40, having a hexagonal portion 41 for adjustment thereof, in a valve assembly or clearance adjuster cylinder casing 42 which is adjustable on the screw-thread carried by the adjustable casing head 40. An annular seal 43 seals the head 40 in the cylinder 42 and a longitudinal inlet port or passageway 44 is provided in the head 40 so as to connect the master cylinder chamber 26 with the interior of the cylinder 42. It will be noted that the cylinder 42 has within the same a large cylindrical chamber 45, provided with a breather port 45a and a cylindrical chamber 46 of a smaller diameter, so as to receive therein a differential plunger 47 having annular seals 48 and 49 on a large piston 50 and on a small piston 51, respectively. At the rearward end of the differential plunger 47 there is an annular extension 52 acting as a guide for a helical return spring 53, one end of which is seated against a disc 54, having openings 55 therein, and the other end of which is received on the rearward end of the differential piston 47. During the work stroke the force of this spring 53 is less than the differential force acting on the pistons 50 and 51. The openings 55 communicate with a screw-threaded discharge or delivery opening 56 in the clearance adjuster cylinder 42. The said disc 54 is arranged to act as a stop for a rearward end 57 of a valve rod 58. Near the end thereof there is a spring retaining ring 59 fastened thereto for holding in place a spiral spring 60 supported on the rearward end of the differential plunger 47 within the annular spring guide 52. The middle portion of the valve rod 58 is provided with a plurality of flutes 61 around the same within a longitudinal passageway 62 in the differential plunger 47. Near its forward end the valve rod 58 has a reduced neck portion 63 adjacent to a conical valve 64, acting as a trapping means, integral with the valve rod 58 and which is arranged to seat on a valve seat 65 located on the forward end of the differential piston 47. On top of the conical valve 64 there is secured an annular rubber valve 66 supported by a flat ring 67 having a screw 68, so that said rubber valve ring 66 can seat against a valve seat 69 on the rear face of the cylinder head 40 to provide an effective seal between the inlet passageway 44 and the longitudinal passageway 62 which traps the accurately determined amount of liquid in the chamber 46 between succeeding strokes of the pistons 50, 51, which cylinder head 40 is adjustably screw-threaded within the clearance adjuster cylinder 42.

Fig. 1 shows the clearance adjuster as being connected, by a pipe 70 having a screw-threaded fitting 71, to a screw-threaded fitting 72 in a ring 73 located within a clutch housing 74 of an automobile, and which contains a conventional clutch assembly 75 normally in engagement. As shown in Fig. 1 the clutch 75 comprises a fly wheel 76 driven by a motor shaft 77 arranged so as to transmit power to a driven shaft 78 by means of a friction clutch disc 79 slidably connected by splines 80 to the driven shaft 78. The friction disc 79 is arranged to be brought into engagement with the fly wheel 76 by means of a pressure plate 81, mounted on the fly wheel 76, said plate having thereon a plurality of pivoted radial clutch fingers or elements 82. The clutch fingers or elements 82 are operated by means of a throw-out ball bearing ring 83 mounted on a sleeve or motor plunger 84 which is supported on the bushing 85 on the shaft 78 and which has a cylinder or enclosure 84a and a retracting spring 84b engaging a flanged ring 84c for withdrawing the bearing 83 and sleeve 84 or motor plunger through the range of slack, said elements 82 being arranged to move and to be moved by the motor plunger 84. The pipe 70 communicates with an annular chamber 86 around the bushing 85 so that the force of the hydraulic liquid from the pipe 70 can bear upon the rear end of the sleeve 84 around which there is a sleeve 87 having an annular seal 88 sealing it on the outside of the sleeve 84. The movement of the sleeve 84 to the left, in Fig. 1, will move the throw-out bearing 83 first to take up the clearance between the same and the ends of the pivoted fingers 82, at which point the valve 64 will begin to open, and further movement of the sleeve 84 to the left will disengage the clutch 75, by swinging the fingers 82 on their pivots 89, which are carried on a casing member 90 connected to the fly wheel 76, inasmuch as the fingers 82 have pivotal connections 91 with the pressure plate 81. A return means, in the form of a plurality of return coil springs 92 carried on bosses 93 secured to the plate 81 and on bosses 94 formed on the casing member 90, normally moves the plate 81 to the left to bring about the engagement of the clutch disc 79 between the fly wheel 76 and the pressure plate 81 at successive stop positions due to wear of the friction faces of the fly wheel 76 and the plate 81 as well as of the discs 79.

The hydraulically operated mechanism comprising the sleeve 84, for moving the throw-out bearing 83 toward and into engagement with the fingers 82, is shown and described in detail in my copending application Ser. No. 515,602, upon Hydraulic Motor Operated Clutch, filed December 24, 1943 now Patent No. 2,501,005.

In Fig. 2 I have shown a portion of the valve as it will appear with all the clearance taken up between the fingers 82 and the throw-out bearing 83, that is to say, at a time when the valve 64 has begun to open by reason of the valve rod end 57 contacting with the apertured stop disc 54.

As shown in Fig. 3 the further movement of the pedal 1 will continue until the valve 64 is entirely open and the clutch 75 disengaged by the pressure plate 81 being freed from the friction disc 79 and the fly wheel 76.

In Fig. 4 I have shown a modification of the clearance adjuster which, it is understood, is to be connected into the system the same as already described and shown in Fig. 1. In this instance I have provided the same parts as shown in Fig. 1 except that in this figure there is a master cylinder 95 which is connected by a passageway 96 to a clearance adjuster sleeve cylinder 97 which is screw-threaded into a master cylinder casing 98 for adjustment therein to alter the clearance volume in the cylinder 97 and which is provided with a lock nut 99. The said clearance adjuster cylinder 97 has a screw-threaded outlet 100 for attachment to the pipe 70, as previously described. Also, there is an annular seal 101 between the master cylinder casing 98 and the clearance adjuster cylinder 97, and in addition an annular chamber 102 connected by a passageway 103 to the reservoir 15. A reduced forward end 104 of the clearance adjuster cylinder is provided with a seal 105 within the cylinder casing 98. It will be noted, furthermore, that the annular chamber 102 is connected by a breather port 106 to the interior of the clearance adjuster cylinder 97 where it communicates with a large cylindrical chamber 107 which is adjacent to a smaller cylindrical chamber 108 therein. Reciprocable within the chambers 107 and 108, there is provided a plunger having a large piston 109 and a smaller piston 110, the former having an annular seal 111 and the latter having an annular seal 112. The piston 110 has at its rear end a guide flange 113 for a helical spring 114 seated around the same, the other end of the spring 114 resting against a stop disc 115 which is provided with apertures 116 communicating with the discharge port 100. Also, in the pistons 109 and 110 there is a longitudinal passageway 117 having therein a valve rod 118 provided with an end 119 to cooperate with the stop disc 115. The valve rod 118 also has a spring retaining ring 120 secured thereto for maintaining in place a spiral spring 121 seated on the rear end of the piston 110. This valve rod 118 has a fluted portion 122, also a reduced forward portion 123 provided with a conical valve 124 thereon which is arranged to seat on a valve seat 125 on the forward end of the piston 109. The said conical valve 124, furthermore, carries on its forward face a disc 126 provided with an annular rubber valve 127 which cooperates with a valve seat 128 on the master cylinder casing 98, and which is held in place by a screw 129.

Figure 5:
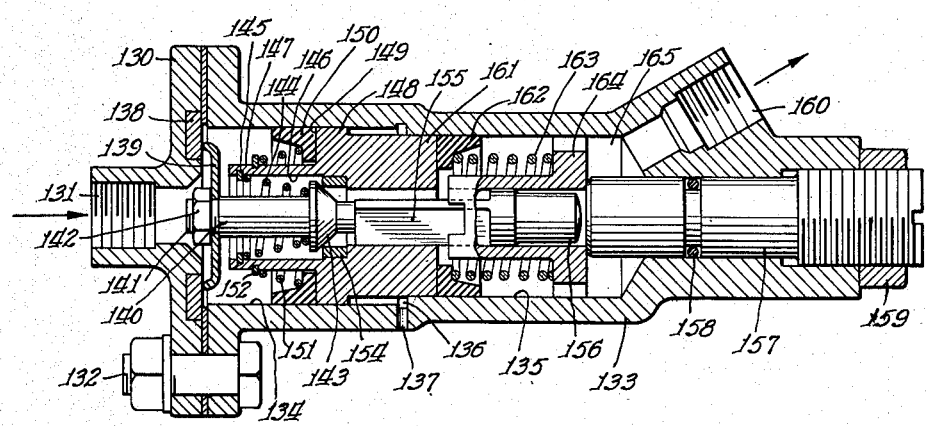
Fig. 5 is a vertical longitudinal section of another modification of my invention.

In the modified form of my invention shown in Fig. 5 I have provided an end plate 130 having a screw-threaded inlet port 131 for attachment of a hydraulic connection to a master cylinder such as is shown in Fig. 1. The plate 130 is attached by bolts 132 to a differential plunger housing 133 having a large cylindrical chamber 134 and a small cylindrical chamber 135 provided with a breather space 136 between the same, connected to the outer air by a vent 137. A valve seat ring 138 is located in the plate 130 to receive an annular valve 139 fastened to a valve stem 140 by a screw end 141 and a nut 142. The valve stem 140 has thereon a conical valve 143 having a valve-seating spring 144 thereon, held in place by a split ring 145 carried in a recess in the interior of a cylindrical chamber 146 in a tubular extension 147 on a large piston 148. The piston 148 has a shoulder 149 carrying an annular lip seal 150 having thereon a spiral spring 151 supported by a split ring 152 in a recess on the outside of the tubular extension 147. The conical valve 143 seats on a valve seat ring 154 in the large piston 148 and on its small end the conical valve 143 has a fluted valve rod 155 having an end 156 which contacts in its end position with an adjustable screw-threaded rod or casing head 157 having a seal 158 and a lock nut 159. A screw-threaded outlet opening 160 conveys the hydraulic fluid to a clutch or brake which is operated thereby after taking up the clearance therein. Attached to the large piston 148 there is a smaller piston 161 having a lip seal 162 and a helical spring 163, the latter being seated against a retaining guide sleeve 164 around the fluted valve rod 155 and seated on the lip seal 162, located in a chamber 165 connecting with the outlet port 160. This arrangement is such that whatever the position of adjustment of the sleeve 164, at the time of closing the valve 143 on the return movement of the pistons 148 and 161 the spring 163 will always have the same force exerted due to its compression as the force of the differential pressure from the pistons 148 and 161.

The modification of my invention shown in Figs. 6 and 7 is constructed similarly to the form of my invention illustrated in Fig. 5. In the said Fig. 6, just as in Fig. 5, I have shown the inlet 131 on the cylinder head 130 fastened by the screws 132 to a flange on the cylinder 133, said cylinder head having, as in Fig. 5, the yielding valve seat 138. However, seating on the valve seat 138 there is a disc-shaped valve 166 having an annular valve element 167, to cooperate with said valve seat 138, formed by an annular recess 168 in disc 166 and secured to a conical valve 169 on a valve stem 170 which passes through a longitudinal cylindrical passageway 171 in a differential plunger 172, which has a large piston 173 provided with a peripheral seal 174 reciprocating in a large cylindrical chamber 175 in the cylinder 133. At one end of the passageway 171 there is a rubber valve seat 176 to cooperate with the conical valve 169. A breather opening 177 is connected to the large cylindrical chamber 175. The said plunger 172, furthermore, has at one end a small piston 178 which is provided with an annular seal 179 and which reciprocates in a small cylindrical chamber 180. Within the passageway 171, furthermore, there is an enlarged cylindrical recess 181 to receive a helical spring 182 held in place by a split ring 183 located around the valve stem 170, in order to urge the conical valve 169 into seated position. Outside of the spring 182 there is a larger helical spring 184 which seats against the small end of the plunger 172, the other end of which is carried within a cylindrical shell 185 fitting within the casing 133, said shell 185 having a number of holes 186 to permit the passage of hydraulic fluid to the discharge or delivery port 160. The cylindrical shell 185 is supported upon one end of an adjusting screw 187, which screw has a locking nut 188 disposed on its other end. An annular seal 189 provides a tight joint on the outside of the adjusting screw 187. The said adjusting screw thus supports the end of the cylindrical shell 185 which in this way forms an abutment for cooperating with the end 156 of the valve stem 170. Ears 190 having holes 191 provide means for attaching the slack adjuster wherever desired.

In Fig. 8 I have shown a diagrammatic illustration of the form of the apparatus as applied to a normally closed clutch system. In this instance I have provided the master cylinder 11, having the reservoir 15 and piston 27, as illustrated in Fig. 1, which has a hydraulic connection 192 to a slack adjuster 193 which may be constructed in the same manner as the slack adjuster in the casing 133, as shown in Fig. 6. This is provided with the differential pistons 173 and 178. A delivery pipe 194 leads to one end of a motor cylinder 195 which has a motor piston 196 therein and is provided with a sleeve 197 having a flange 198 for retaining a retracting spring 199 in place for retracting the motor piston 196 through the clearance range, inasmuch as the spring 199 is supported at its other end on a fixed support 200. The motor piston 196 has, as shown diagrammatically therein, a small extension 201 to provide, in the starting position of the apparatus, a clearance 202, which is adjustable according to the position of the screw 187, with regard to the stop position of an end 203 of an arm or element 204 on a bell crank lever 205 supported on a pivot 206 from a fixed bracket 207, which is shown diagrammatically as having an adjustable screw 208 in a bracket 209 on the fixed bracket 207. Another arm 210 of the bell crank lever 205 has a pin 211 connected to a spring-supporting plate 212 supported on one end of a return spring 213 having at its other end a spring-supporting plate 214 carried on an abutment 215 on a fixed support 216. This figure is a diagrammatic representation of a slack adjuster arranged for operating a normally closed clutch system, the screw 208 being representative of the varying positions of the clutch in the progressive wear of the friction surfaces therein in successive operations of the clutch.

The diagrammatic illustration in Fig. 9 represents the system as applied to a normally open clutch or brake system. In this instance the master cylinder 11 and slack adjuster 193 are constructed just the same as in Fig. 8. Also, a motor cylinder 217 and a motor piston 218 with an extension 219 are provided the same as in Fig. 8. In this instance, however, the extension 219 bears against a bell crank lever 220 on a fixed pivot 221 and the bell crank lever 220 has an arm or element 222 which bears at all times against the extension 219 against which it is urged by a return or retracting spring 223 arranged in the same manner as the spring 213 in Fig. 8 except that in this instance the spring 223 is mounted nearer to the pivot 221 on an arm 224 and the outer end of said arm has a screw-threaded abutment 225 provided with a head 226. This screw 225 represents partly the successive stop positions, as in the case of the screw 208, due to the progressive wear on the friction parts of the clutch. In other words, the position of the said screw 225 may represent wear on the brake shaft according to the adjustable positions on the screw head 226 which establishes in the operation of the slack adjuster a clearance 227 with regard to a plate 228 supported by a spring 229 which is retained in a spring housing 230. The lower end of the housing 230 rests upon the upper end of the screw 231 screw-threaded in a fixed support 232 which, by its position, represents the wear on the brake drum in successive positions.

In the operation of my invention, referring first to Figs. 1 to 3, the clutch 75 will be normally in engagement, as shown in Fig. 1, with the piston 27 withdrawn to the left in said figure, the valves 64 and 66 being seated, and with the clutch throw-out bearing 83 being out of contact with the clutch fingers 82. When the pedal 1 is operated the liquid received through the port 25 from the reservoir 15 into the master cylinder 26 will be discharged therefrom to the outlet opening 38, thus closing the equalization passageway 25. The pressure of the liquid in the passageway 44 will unseat the valve 66 and move the pistons 50 and 51 to the right while maintaining the valve 64 closed and thus delivering from the smaller cylinder 46 to the clutch, initially, to the sleeve 84, the liquid trapped in the smaller cylinder 46 under higher pressure than the liquid which is received from the master cylinder into the cylinder 45 due to the differential sizes of the pistons 50 and 51 therein. This will continue until the clearance volume of liquid present in the smaller cylinder 46, at the right of the piston 51, in Fig. 1, will have brought the throw-out bearing 83 into contact with the fingers 82, as shown by dotted line at "A," whereupon the valve 64, 65 will unseat by reason of the end 57 of the valve rod 58 contacting with the stop plate 54. When the point where the valve 64, 65 becomes unseated is reached the low pressure liquid from the passageway 44 will pass out through the pipe 70 so as to move the sleeve 84 farther, as shown by dot-dash lines at "B," and thus disengage the friction disc 79 from the adjacent surfaces of the fly wheel 76 and the pressure plate 81, thus releasing the clutch. When it is desired to engage the clutch again the manual pressure on the pedal 1 is relaxed until the parts are again in the position of the initial contact, as shown at "A," the piston 51 prior and up to such time having remained in its advanced position due to the differential pistons 50, 51 providing a force overcoming the force of the return spring 53. At this time, which is also the time when the valve stem 57 leaves the stop 54, the valve 64, 65 closes quickly and sharply, always at the point when the same identical differential of pressures on the pistons 50 and 51 permits its closing, under the influence of the spring 69 and the relative sizes of the cylindrical chambers 45 and 46, thus establishing at the time of closing of the valve 64, 65, an accurate and definite volume of clearance liquid in the small cylinder 46 at the right of the piston 51, in Fig. 1, for the next pulsator stroke and which volume is accurately maintained until the next stroke of the pistons 50 and 51 to the right, in Fig. 1. Accordingly, this volume will always remain the same in succeeding strokes for the operation of the clutch or brake or other device being operated thereby, unless altered by adjustment. However, it will be understood that this volume can be adjusted at will by changing the position of the casing head 40 within the clearance adjuster cylinder 42. In the retraction of the master cylinder piston 27 it will be noted that if for any reason the volume of liquid in the master cylinder piston chamber has decreased, compensating liquid can enter the same through the passageways 24 and 33 past the rubber cup 34. Normal compensation takes place in the retracted position of the piston 27 through the port 25.

The modified form of my invention in Fig. 4 operates in substantially the same manner, but in this instance the adjustment of the clearance volume is obtained by the adjustment of the sleeve cylinder casing 97 within the master cylinder casing 98, the adjustment being maintained by means of the lock nut 99. In this instance it will also be noted that the breather connection between the pistons 109 and 110 is provided through the master cylinder reservoir 15 instead of opening directly to the outer air, as in Fig. 1. Otherwise, the operation is the same as shown in the preceding form of my invention.

The form of my invention shown in Fig. 5 operates in the same manner as the form shown in Figs. 1 to 3 except that in this instance the adjustment is made of the possible stroke of the differential piston 148, 161 by the adjustable screw-threaded rod or casing head 157 contacting the valve rod end 156, thus effectively adjusting the available clearance volume.

It will be understood, of course, that the clearance adjuster in any of the forms above described can be applied, instead, to the operation of a normally open clutch or a brake, as for instance on an automobile or airplane, or in fact in the operation of any other apparatus for performing work, in which it is desired to first take up the clearance and then to operate the apparatus, further, thereby.

Referring to the operation of the slack adjuster illustrated in Figs. 6 and 7, inasmuch as this form of my invention is arranged for the operation of a normally closed clutch, the operation is substantially the same as in the form of my invention shown in Fig. 5, except that in this instance the valve seating spring 182 is located at the same end of the plunger 172 as the spring 184, whereas the valve seating spring 144 is at the other end of the plunger in Fig. 5. This arrangement of the spring 182 in Fig. 6, therefore, renders it more accessible.

In the operation of the diagrammatic representation of the normally closed clutch system equipped with my invention, as shown in Fig. 8, the operation thereof will continue to maintain in the starting position of the successive operations of the impulser piston 27 a given amount of clearance 202 with successive positions of the clutch members, notwithstanding the progressive wear thereon due to the operation of the same. This progressive wear is represented by the screw 208 in this diagram. However, different amounts of clearance volume produced by the slack adjuster 193 can be obtained by the adjustment of the screw 187 whenever desired. In this way an accurate and dependable slack adjustment can be attained owing to the accurate maintenance of a given degree of clearance or slack adjustment obtained in the clutch or other apparatus being operated by the impulser.

The diagrammatic representation of a brake system or normally open clutch system illustrated in Fig. 9, operates in substantially the same manner as the clutch adjuster in Fig. 8 except in this instance the motor piston is returned by the spring 223 and the clearance is, thus, not located between the motor piston 218 and the arm or element 222 of the bell crank lever 220, but is located at 227, between the screw head 226 and the spring retainer plate 228, and, accordingly, the screw head would be comparable to a brake shoe in the braking system and the spring retainer plate 228 would be comparable to the brake drum in such system. Also, in the case of a normally open clutch system, the screw head 226 and the spring retainer plate 228 would be comparable to the two friction surfaces on the fly wheel and the pressure plate of the normally open clutch.

While I have described my invention above in detail, I wish it to be understood that many changes may be made therein without departing from the spirit of the same.

I claim:

1. The combination of a pulsator mechanism, a casing having a hydraulic inlet and a hydraulic outlet, a large piston member near the inlet, a smaller piston member near the outlet, means for retracting the piston members, a valve associated with said piston members, means for unseating the valve by movement of the piston members toward said outlet, and disengageable mechanism, comprising a lever and a sleeve, disengaged from the lever by the movement of the liquid from the hydraulic inlet after the unseating of the valve, said mechanism being provided with a clearance between the lever and said sleeve taken up by the liquid supplied from the piston members before unseating the valve.

2. The combination of a pulsator mechanism, a casing having a hydraulic inlet and a hydraulic outlet, a large piston member near the inlet, a smaller piston member near the outlet, means for retracting the piston members, a valve associated with said piston members, means for unseating the valve by movement of the piston members toward said outlet, and a work performing device, comprising a lever and an annular bearing, disengaged from the lever by the movement of the liquid from the hydraulic inlet after the unseating of the valve, said device being provided with a clearance between the lever and said annular bearing taken up by the liquid supplied from the piston members before unseating the valve.

3. In a pulsator mechanism, a casing having a hydraulic inlet and a hydraulic outlet, a large piston member near the inlet, a smaller piston member near the outlet, said members being connected together, means for retracting the piston members, a valve associated with said pistons, and means for unseating the valve by movement of the piston members toward said outlet, said piston members having carried thereby, also, a valve having said casing as its valve seat for cutting off the access of liquid from the inlet when the piston members are in retracted position.

4. The combination of a pulsator mechanism, a casing having a hydraulic inlet and a hydraulic outlet, a large piston member near the inlet, a smaller piston member near the outlet, means for retracting the piston members, a valve associated with said piston members, means for unseating the valve by movement of the piston members toward said outlet, and disengageable mechanism disengaged by the movement of the liquid from the hydraulic inlet after the unseating of the valves and being provided with a clearance taken up by the liquid supplied from the piston members before the unseating of the valve, said piston members having carried thereby, also, a valve located on the large piston having said casing as its valve seat for cutting off the access of liquid from the inlet when the large piston member is in retracted position.

5. In a pulsator operating arrangement including means defining a pulsator motor, means applying a retracting force to said pulsator motor, a delivery and return valve assembly for controlling the operating pressure to and from said pulsator motor, said valve comprising means effective to deliver a high range of pressures therethrough, means including a differential piston carrying a valve and a travel controlled opening device for said valve arranged to open the valve at the differential pressure present during the differential piston travel, sharply responsive to the delivery thereto of a selected value of pressure below said range effective to shut off fluid communication therethrough, and means responsive to the continued delivery of pressure fluid from said pulsator motor by virtue of the action of said retracting means effective to displace a selected measured quantity of additional fluid from said pulsator determining precisely the movement of said pulsator in the retracted position following the closure of said shut off means.

6. In a pulsator operating arrangement including means defining a pulsator motor, means applying a retracting force to said pulsator motor, a delivery and return valve assembly for controlling the operating pressure to and from said pulsator motor, said valve comprising means effective to deliver a high range of pressures therethrough, means including a differential piston carrying a valve and a travel controlled opening device for said valve arranged to open the valve at the differential pressure present during the differential piston travel, sharply responsive to the delivery thereto of a selected value of pressure below said range effective to shut off fluid communication therethrough, said means comprising a check valve having a travel controlled opening device for said valve, and means responsive to the continued delivery of pressure fluid from said pulsator motor by virtue of the action of said retracting means effective to displace a selected measured quantity of additional fluid from said pulsator determining precisely the movement of said pulsator in the retracted position following the closure of said shut off means.

7. In a pulsator operating arrangement including means defining a pulsator motor, means applying a retracting force to said pulsator motor, a delivery and return valve assembly for controlling the operating pressure to and from said pulsator motor, said valve comprising means effective to deliver a high range of pressures therethrough, means including a differential piston carrying a valve and a travel controlled opening device for said valve arranged to open the valve at the differential pressure present during the differential piston travel, sharply responsive to the delivery thereto of a selected value of pressure below said range effective to shut off fluid communication therethrough, said means comprising a check valve as well as a supply cut-off valve, and means responsive to the continued delivery of pressure fluid from said pulsator motor by virtue of the action of said retracting means effective to displace a selected measured quantity of addtiional fluid from said pulsator determining precisely the movement of said pulsator in the retracted position following the closure of said shut off means.

8. A device of the character described including, housing means including fluid connections thereto, means defining a first pressure-responsive area and a second pressure-responsive area, positive means connecting said areas together, said first area being in communication with a first one of said fluid connections, and said second area being in communication with the other one of said fluid connections, the difference in areas between said two pressure-responsive areas permitting a differential force to produce movement in one direction, when said areas are subjected to the same unit pressure, means applying a predetermined value counteracting force to said differential force, a cut-off valve interposed between said fluid connections, stop means responsive to a predetermined travel position of said positive connecting means in one direction effective to cause the opening of said valve arranged to open the valve at the differential pressure present during the differential piston travel to provide free flow between said fluid connections and responsive to movement of said positive connecting means in the opposite direction effective to cause closing of said valve.

9. In a device of the character described, including means defining a pulsator pressure fluid flow control valve arrangement, said means comprising, a housing having a stepped bore including a first cylindrical portion joining with a second cylindrical portion having a reduced cross section, a first port in said first portion, a second port in said second portion, means defining a valve assembly proper including a tubular-like member provided with a first piston-like portion received in sealed reciprocable relation within said first bore and joined with a second piston-like portion received in sealed slidable relation within said reduced portion, the difference in piston areas providing a differential control area, a valve seat facing in the direction of said first named port and being located in the terminal of said tubular member adjacent to said first piston portion, a valve cooperating with said seat means responsive to movement of said valve assembly by the delivery of pressure through said first named port to effect the opening of said valve arranged to open the valve at the differential pressure present during the differential piston travel to provide flow through said housing and said second-named port, resilient means normally urging said valve in the direction of engagement with said seat, means normally urging said valve assembly in the direction of said first-named port with a selected predetermined force.

10. In a pulsator mechanism, a casing having a hydraulic inlet and a hydraulic outlet, a retractable differential plunger movable by the incoming liquid towards the outlet, a valved passageway to opposite sides or the plunger to connect the inlet to the outlet when open, and stop means for opening the valve at the differential pressures present during the differential piston travel when the plunger has been moved towards the outlet, said mechanism being constructed to retain the valve open after a relaxation of the pressure in the inlet until a predetermined pressure has been reached in the outlet.

11. In a pulsator mechanism having an impulser, a casing having a hydraulic inlet and a hydraulic outlet, a retractable differential plunger movable by the incoming liquid towards the outlet, a valved passageway to opposite sides of the plunger to connect the inlet to the outlet when open, a motor plunger and cylinder connected to said outlet to be moved the same distance by the liquid received therefrom on successive operations of the impulser notwithstanding successively different starting positions of the motor plunger, and means for opening the valve at the differential pressures present during the differential piston travel when the plunger has been moved towards the outlet, said mechanism being constructed to retain the valve open after a relaxation of the pressure in the inlet until a predetermined pressure has been reached in the outlet.

12. In combination, a pulsator having a displaceable impulser plunger and a cylinder therefor, a hydraulic clearance adjuster, having an inlet port and a delivery port, hydraulically connected to the impulser, a motor plunger and cylinder having a hydraulic connection to said delivery port, a retracting device connected to the motor plunger, an engaging element arranged to move the motor plunger and to be movable by the motor plunger, a second element engaging therewith, and means arranged to return said first mentioned element to successively variable stop positions during successive operations of the impulser, said clearance adjuster comprising retractable differential measuring means to trap the liquid between the clearance adjuster and the motor plunger when the impulser plunger is in its undisplaced position and to release the said trapped liquid to the hydraulic connection between the motor plunger and the clearance adjuster when the impulser plunger has been displaced to a predetermined extent but to trap liquid again when the first mentioned element reaches its stop position so as to establish thereby the same predetermined amount of clearance between the motor plunger and said second mentioned element at each successive operation of the impulser, notwithstanding wear of the second mentioned element.

13. In combination, a pulsator having a displaceable impulser plunger and a cylinder therefor, a hydraulic clearance adjuster, having an inlet port and a delivery port, hydraulically connected to the impulser, a motor plunger and cylinder having a hydraulic connection to said delivery port, a retracting device connected to the motor plunger, an engaging element arranged to move the motor plunger and to be movable by the motor plunger, a second element engaging therewith, and means arranged to return said first mentioned element to successively variable stop positions during successive operations of the impulser, said clearance adjuster comprising retractable differential adjustable measuring means to trap the liquid between the clearance adjuster and the motor plunger when the impulser plunger is in its undisplaced position and to release the said trapped liquid to the hydraulic connection between the motor plunger and the clearance adjuster when the impulser plunger has been displaced to a predetermined extent but to trap a predetermined adjustably variable volume of liquid again when the first mentioned element reaches its stop position so as to establish thereby the same predetermined adjustable amount of clearance between the motor plunger and said second mentioned element at each successive operation of the impulser, notwithstanding wear of the second mentioned element.

14. In combination, a pulsator having a displaceable impulser plunger and a cylinder therefor, a hydraulic clearance adjuster, having an inlet port and a delivery port, hydraulically connected to the impulser, a motor plunger and cylinder having a hydraulic connection to said delivery port, a retracting device connected to the motor plunger, an engaging element arranged to move the motor plunger and to be movable by the motor plunger, a second element engaging therewith, and means arranged to return said first-mentioned element to successively variable stop positions during successive operations of the impulser, said clearance adjuster comprising retractable differential measuring means having a valved plunger and cylinder to trap the liquid between the clearance adjuster and the motor plunger when the impulser plunger is in its undisplaced position and to release the trapped liquid to the hydraulic connection between the motor plunger and the clearance adjuster when the impulser plunger has been displaced to a predetermined extent but to trap liquid again when the first-mentioned element reaches its stop position so as to establish thereby the same predetermined amount of clearance between the motor plunger and the second mentioned element at each successive operation of the impulser, notwithstanding wear of the second mentioned element.

15. In a pulsator mechanism, a casing having a hydraulic inlet and a hydraulic outlet, a large piston member near the inlet, a smaller piston member near the outlet, means for retracting the piston members, a valve associated with said piston members, and stop means for unseating the valve by movement of the piston members toward said outlet, said piston members being connected together and having a valve seat for said valve arranged to be moved away from said valve at the differential pressures present during the differential piston travel by the differential pressure on said piston members when the valve is unseated by said means.

16. In a pulsator mechanism, a casing having a hydraulic inlet and a hydraulic outlet, a large piston member near the inlet, a smaller piston member near the outlet, means for retracting the piston members, a valve associated with said piston members, and stationary means for unseating the valve by movement of the piston members toward said outlet, said piston members being connected together and having a valve seat for said valve arranged to be moved away from said valve at the differential pressures present during the differential piston travel by the differential pressure on said piston members when the valve is unseated by said means and to be returned to the valve when the pressure has been relaxed sufficiently for the movable valve seat to reach the stationary valve.

EDWARD A. ROCKWELL.

REFERENCES CITED

The following references are of record in the file of this patent:

UNITED STATES PATENTS

| Number | Name | Date |
|---|---|---|
| 697,140 | Goldschmidt | Apr. 8, 1902 |
| 2,156,120 | LaBrie | Apr. 25, 1939 |
| 2,229,055 | Dick | Jan. 24, 1941 |
| 2,345,811 | Harp | Apr. 4, 1944 |
| 2,385,625 | Hopmans | Sept. 25, 1945 |

FOREIGN PATENTS

| Number | Country | Date |
|---|---|---|
| 358,126 | Great Britain | Oct. 8, 1931 |
| 365,069 | Great Britain | Jan. 6, 1932 |
| 389,930 | Great Britain | Mar. 30, 1935 |
| 504,278 | Great Britain | Apr. 19, 1939 |
| 547,465 | Great Britain | Aug. 28, 1942 |